March 24, 1942. P. M. G. TOULON Re. 22,055
SYNCHRONIZATION SYSTEM FOR TELEVISION
Original Filed July 3, 1937
Fig. 1,
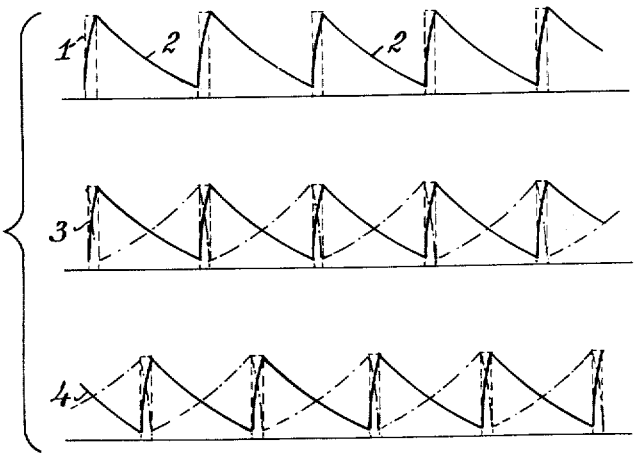
Fig. 2,
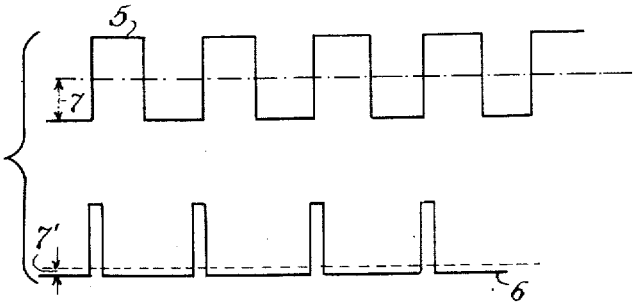
Fig. 3,
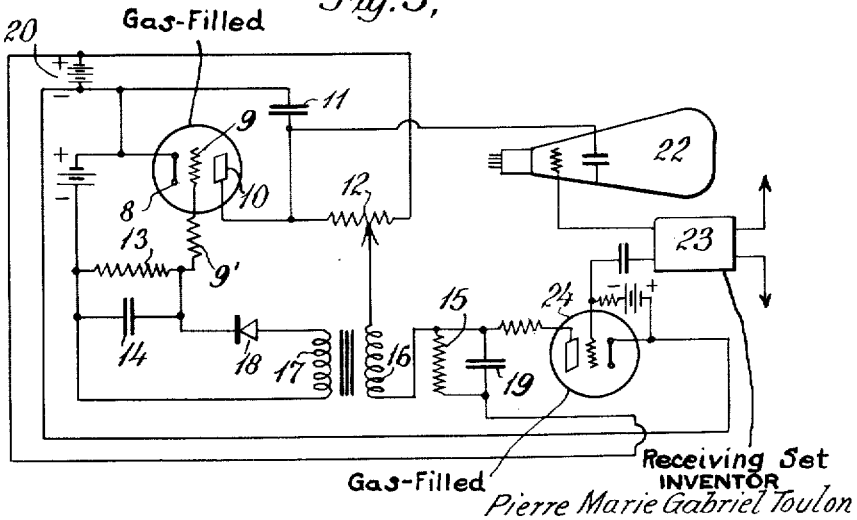
INVENTOR
Pierre Marie Gabriel Toulon
BY Kenyon & Kenyon
ATTORNEYS Reissued Mar. 24, 1942 Re. 22,055

UNITED STATES PATENT OFFICE 22,055

SYNCHRONIZATION SYSTEM FOR TELEVISION

Pierre Marie Gabriel Toulon, Puteaux, France, assignor to Hazeltine Corporation, Jersey City, N. J., a corporation of Delaware Original No. 2,227,815, dated January 7, 1941, Serial No. 151,807, July 3, 1937. Application for reissue April 24, 1941, Serial No. 390,212. In France July 8, 1936

13 Claims. (Cl. 250—36)

This invention relates to a new process to assure the synchronism of a relaxation oscillatory system by means of electric signals coming from an outside station. It concerns more particularly the synchronization of television receiving stations comprising a relaxation device controlled by the synchronization signals coming from a transmitting station.

One of the most important applications of the invention is that of assuring the syncronism between a transmitting station and the electronic beam of a Braun tube at the receiving station.

Present-day Braun tube receivers generally comprise two beam-deflecting devices of any of several well-known types. One type consists of a condenser which is charged progressively, and a relay of the extreme vacuum or gas type through which the condenser suddenly discharges when this relay receives the synchronization signals coming from the transmitting station. This system has the drawback that if one of the signals fails or if a parasitic or spurious impulse releases the relay out of time, then the image becomes defective.

The present invention is based on an entirely different process which consists in providing locally a relaxation device having a frequency very near that of the frequency of the lines or of the images of the transmitting station, and which is completely controlled and compelled to remain in coincidence with that of the transmitting station, by the continuous measurement of the difference in phase between the signals or oscillations developed by these two devices. Contrary to what has been done up to the present time, the signal received is not used to release the local relaxation device at the initiation of each relaxation cycle, but the latter operates independently of the transmission of the synchronization signals and its instantaneous frequency is momentarily controlled by a device which automatically compensates for the phase displacement between the synchronization signals and the oscillations of the relaxation device.

In accordance with the invention, there is provided in a television receiver, a circuit for supplying periodic synchronizing signals consisting of a series of periodic pulses of small energy content relative to that of a sine wave of the same frequency and amplitude and subject to spurious pulses of similar nature and to momentary interruptions, a relaxation oscillator proportioned to generate a periodic output wave of substantially the same average frequency as the synchronizing signals in the absence of a frequency-correcting control voltage applied thereto, and means for substantially eliminating the effect of spurious pulses and momentary interruptions of the periodic pulses. This last-mentioned means comprises means for deriving a periodic wave dependent in wave form upon the phase difference between the synchronizing signals and the output wave of the relaxation device, together with means for developing from the derived wave a unidirectional frequency-correcting control voltage. This control voltage is utilized to vary the instantaneous frequency of the relaxation device, thereby substantially to maintain the output of the device in phase with the synchronizing signals, and an output wave of the relaxation device is utilized to effect a scanning operation of the receiver.

In accordance with one specific embodiment of the invention, the very short synchronization impulses are transformed into signals the wave form of which resembles that of the oscillations of the local relaxation device and the difference in phase between the two signals of the same wave form is measured. The result of this measure is preferably that of causing a drop in voltage across a resistance which is a function of the phase displacement, and this variation in voltage is utilized in order to correct the average frequency of the local relaxation device. The arrival of a parasitic impulse or the absence of the synchronization signal has practically no effect on the quality of the image, because the energy content of such a single pulse or such a single synchronizing signal is so small that the variation in the average voltage across the resistance resulting therefrom is too small to modify in an appreciable manner the average frequency of the relaxation device; in other words, the framing of the image suffers practically no modification.

The invention will be better understood by reference to the drawing, which illustrates by way of example a special manner of execution of complete control of the frequency of a "thyratron" relaxation device which feeds a Braun tube by means of the synchronization pulses of a standard carrier-wave television transmitting station and in which Figs. 1 and 2 represent, as a function of time, the wave form of the signals in different parts of the apparatus; and Fig. 3 shows the basic diagram of a synchronizing system in accordance with the invention.

In Fig. 1, i is the form of the synchronizing signals after selection or separation from the composite received television signal, which may include also synchronizing signals of other types, and, therefore, represents a wave comprising rectangular pulses derived from the synchronizing signals. By means of a circuit having a certain time constant, which is introduced in accordance with the invention, these signals are transformed into a signal of saw-tooth wave form, curve 2, therefore, also representing a wave form derived from and dependent upon the synchronizing signals. The curve 3 in full lines represents the voltage of the same wave form supplied by the local relaxation device, which is assumed to be almost coincidental in phase with the television transmitting station. The curve 4 in full lines shows likewise the voltage of this relaxation device in the case where a large phase difference exists between the local relaxation device and the transmitting station. In this figure there can be seen in dot and dash lines the inverse curves of the voltages 3 and 4.

In accordance with the invention, the phase difference between the voltage wave of curve 2 and of the curves 3 or 4 is measured. This measurement is obtained by algebraically combining the wave of curve 2 with the inverse waves of curves 3 or 4, that is, by subtracting or taking the difference between the two voltages and by rectifying the effective voltage so derived. This operation consists in adding the ordinates of curve 2 with those of the curves in dot and dash lines representing the inverse of either curve 3 or curve 4.

The principle of this measurement appears clearly if reference is made to Fig. 2, where it can be seen that it is possible to obtain very easily a wave the effective value and wave form of which depend on the phase difference between the transmitting station and the local relaxation device. In this figure, 5 designates the subtraction of the two voltages when these voltages are almost in phase opposition (curves 2 and 4 of Fig. 1). In curves 6 there is shown the same subtraction of these two voltages when they are almost coincidental in phase (curves 2 and 3 of Fig. 1). Lines 7 and 7' indicate the rectified voltages which correspond, respectively, to the waves 5 and 6 and, therefore, represent the peak values of the waves on the lower side of their alternating current axes represented by the broken horizontal line in each case. These values of the rectified voltage greatly differ in the two cases and, therefore, depend on the phase lag or displacement between the curves 2 and 4 or 2 and 3 of Fig. 1. When the voltages supplied by the synchronizing pulses and by the local relaxation device are essentially in phase, the average value of the corresponding rectified voltage, as indicated by line 7' is very small; that is, there is effectively no frequency-correcting control voltage supplied to the oscillator 10 which, in the absence of such frequency-correcting voltage, generates an output wave of substantially the same average frequency as the synchronizing signal. On the contrary, if the lag is appreciable, the rectified voltage is considerable, as shown by line 7. This rectified voltage is used to derive a unidirectional frequency-correcting control effect momentarily to vary the instantaneous frequency of the local relaxation device in such a manner as to make it completely subservient to the frequency of the synchronizing signals.

If the relaxation device consists of a gas-filled tube such as a "thyratron" associated with a fixed condenser and a resistance, the relaxation frequency may be varied within rather wide limits by changing the value of the bias of the "thyratron" grid. As this bias increases, the frequency of the oscillations decreases. It can easily be understood that it is possible to realize automatic control if the lag is initially reduced to a very low value. If the lag tends to increase, the frequency of oscillation of the local relaxation device is varied minutely and momentarily by an amount to adjust the instantaneous frequency of the relaxation oscillations in such a direction that it compensates this lag, due to the modification of the bias of the grid.

Fig. 3 shows the details of a specific embodiment of the invention utilizing the proposed control system in the particular case in which a "thyratron" is used in the relaxation device. In this figure, 8 designates the cathode of the "thyratron" and 10 in its plate. The condenser 11, charged through the resistance 12 by the continuous voltage source 20, constitutes with this resistance and with the "thyratron" the local relaxation device which serves to displace the cathode-ray beam in the Braun tube 22 and thereby effect a scanning operation in the receiver. The numeral 23 designates the radio receiving set which receives the composite television signal including the synchronization impulses; the latter are selected by the tube 24 in accordance with their amplitude or by other well-known devices and appear as a signal of the wave form of curve 1 of Fig. 1. Due to a resistance 15 and a condenser 19 these impulses are transformed into a saw-tooth voltage across the load resistor 15 of tube 24. The voltage which corresponds to the difference between the drops in voltage in the resistances 12 and 15 is applied to the primary winding 16 of a transformer. Thus the amplitude of the periodic pulsating voltage corresponds to the difference between the drops in voltage in the resistances 12 and 15. The secondary winding 17 of this transformer charges through a rectifier 18 consisting, for instance, of a copper-oxide disc, a condenser 14 which slowly discharges through the resistance 13. The grid of the "thyratron" 9 is connected through a resistance 9' with the terminal of this condenser 14. The average potential on grid 9 thus varies with the average voltage between the terminals of the circuit 13–14 which has a certain time constant; in other words, the average potential on the grid of the "thyratron" is a function of the phase displacement between the oscillations of the local relaxation device and the synchronization signals. This average potential defines the frequency of the relaxation device. In order to obtain an average value of the voltage across condenser 14 corresponding to the values 7 and 7' of Fig. 2, it is necessary that the load circuit 13–14 of rectifier 18 have a time constant which is long compared to the period of the synchronizing signals. Rectifier 18 and its associated load circuit effectively provides a conventional peak-rectifier circuit effective to measure the peak amplitude of the voltage across secondary winding 17 on one side of its alternating current axis. Specifically, the circuit is effective to measure the peak value of the voltage waves 5 and 6 of Fig. 2 on the lower side of their alternating current axes, as represented by the ordinates 7 and 7' of Fig. 2.

Under normal conditions the "thyratron" discharges slightly before the arrival of the synchronizing pulse. There results from this a certain effective value of the current in the transformer 16—17 and a certain value of the rectified current and therefore a certain bias of the grid 9. This value corresponds exactly to that for which the frequency of the relaxation device is equal to the frequency of the synchronization signals and the two are substantially in phase. The system is controlled for the reason that if the local relaxation device tends to accelerate for any reason whatsoever there is an increase in the phase difference between the saw-tooth currents in the resistances 12 and 15. The current in the transformer 16—17 also increases and also the bias of the grid 9. This has the desired effect of reducing the frequency of the relaxation device. Vice versa, if the relaxation device tends to slow down, the phase difference decreases and likewise the average bias of the grid 9. The effect of this is momentarily to increase the instantaneous frequency of the relaxation device. The relaxation device therefore remains in this manner in synchronism and in phase with the synchronization signals.

In summary, therefore, it is seen that, by the arrangement of Fig. 3 there is provided in a television receiver, a circuit including tube 24 for supplying periodic synchronizing signals consisting of a series of periodic pulses of small energy content relative to that of a sine wave of the same frequency and amplitude and subject to spurious pulses of similar nature and to momentary interruptions. Also, it is seen that the gas-filled "thyratron" tube is included in a relaxation device for generating a periodic output wave of substantially the same average frequency as the synchronizing signals translated by tube 24 in the absence of a frequency-correcting control voltage applied thereto. In order substantially to eliminate the effect of the spurious pulses and momentary interruptions of the periodic synchronizing signals, there is provided means comprising transformer winding 16 and resistors 12 and 15 effective to develop a periodic wave in secondary winding 17 which is dependent in wave form upon the phase difference between the synchronizing signals and an output wave of the relaxation device. The rectifier 18 and time-constant circuit 13—14 constitutes a means for developing from the periodic voltage wave developed in secondary winding 17 a unidirectional frequency-correcting control voltage which is applied to the input circuit of the gas-filled tube to vary the instantaneous frequency of the relaxation device, thereby substantially to maintain the output of the device in phase with the synchronizing signals. Means are also included in the circuit for applying an output wave of the relaxation device to the pair of scanning plates of the Braun tube 22, thereby to effect a scanning operation of the receiver.

The advantage of this device over former systems lies in the fact that the synchronization signals may be absent either on account of fading or on account of parasitic disturbances or else additional disturbing signals may enter, without causing the local relaxation device, however, to cease to operate and consequently without causing the sweeping or scanning of the lines or images of the Braun tube 22 to cease to exist.

On the other hand, the changes which may appear in the frequency of the sweeping or scanning on account of these different disturbances are very slow and very gradual, so that the lateral displacements of the image which may originate on account of the lack of synchronization signals or on account of the presence of disturbing signals are of a very slight amplitude and there do not appear any longer on the screen of the Braun tube completely desynchronized strips which completely blur the image, as in the case of present-day apparatus.

Having thus described my invention, what I claim is:

1. In a television system, a receiver including a relaxation device having a saw-tooth output wave form, a source of synchronizing signals external to said receiver, means for transforming said synchronizing signals to have a wave form substantially the same as the output wave form of said relaxation device, and means for varying the frequency of said relaxation device in accordance with the phase difference between the output of said relaxation device and said transformed synchronizing signals.

2. In a television system, a relaxation device having a saw-tooth output wave form and including a gas-filled tube having a grid, a source of synchronizing signals, means for transforming said synchronizing signals to have a wave form substantially the same as the output wave form of said relaxation device, means for producing a direct current voltage the amplitude of which is a function of the phase difference between the output of said relaxation device and said transformed synchronizing signals, and means for applying said direct current voltage to said grid.

3. In a television system, a receiver including a relaxation device having a saw-tooth output wave form, a source of synchronizing signals external to said receiver, means for transforming said synchronizing signals to have a wave form substantially the same as the output wave form of said relaxation device, means for producing a potential which is a function of the phase difference between the output of said relaxation device and said transformer synchronizing signals, and means for utilizing said potential to vary the frequency of said relaxation device.

4. In a television system, a relaxation device having a saw-tooth output wave form, a source of synchronizing signals, means for transforming said synchronizing signals to have a wave form substantially the same as the output wave form of said relaxation device, means for producing a direct current voltage the amplitude of which is a function of the phase difference between the output of said relaxation device and said transformed synchronizing signals, and means for utilizing said direct current voltage to vary the frequency of said relaxation device.

5. In a television receiver, a circuit for supplying periodic synchronizing signals consisting of a series of periodic pulses of small energy content relative to that of a sine wave of the same frequency and amplitude and subject to spurious pulses of similar nature, a relaxation device for generating a periodic output wave of approximately the same average frequency as said synchronizing signals, and means for substantially eliminating the effect of said spurious pulses and momentary interruptions of said periodic pulses comprising, means for deriving a periodic wave dependent in wave form upon the phase difference between said synchronizing signals and said output wave of said relaxation device, rectifier means for developing from said derived wave a unidirectional control voltage, means for utilizing said control voltage to vary the instantaneous frequency of said relaxation device, thereby substantially to maintain said output of said device in phase with said synchronizing signals, and means for utilizing an output wave of said relaxation device to effect a scanning operation of said receiver.

6. In a television receiver, a circuit for supplying periodic synchronizing signals consisting of a series of periodic pulses of small energy content relative to that of a sine wave of the same frequency and amplitude and subject to spurious pulses of similar nature, a relaxation device for generating a periodic output wave of substantially saw-tooth wave form and of approximately the same average frequency as said synchronizing signals, and means for substantially eliminating the effect of said spurious pulses and momentary interruptions of said periodic pulses comprising, means for deriving a periodic wave dependent in wave form upon the phase difference between said synchronizing signals and said output wave of said relaxation device, rectifier means for developing from said derived wave a unidirectional control voltage, means for utilizing said control voltage to vary the instantaneous frequency of said relaxation device, thereby to maintain said output of said device in phase with said synchronizing signals, and means for utilizing an output wave of said relaxation device to effect a scanning operation of said receiver.

7. In a television receiver, a circuit for supplying periodic synchronizing signals consisting of a series of periodic rectangular pulses of small energy content relative to that of a sine wave of the same frequency and amplitude and subject to spurious pulses of similar nature, a relaxation device for generating a periodic output wave of approximately the same average frequency as said synchronizing signals, and means for substantially eliminating the effect of said spurious pulses and momentary interruptions of said periodic pulses comprising, means for deriving a periodic wave dependent in wave form upon the phase difference between said synchronizing signals and said output wave of said relaxation device, rectifier means for developing from said derived wave a unidirectional control voltage, means for utilizing said control voltage to vary the instantaneous frequency of said relaxation device, thereby substantially to maintain said output of said device in phase with said synchronizing signals, and means for utilizing an output wave of said relaxation device to effect a scanning operation of said receiver.

8. In a television receiver, a circuit for supplying periodic synchronizing signals consisting of a series of periodic pulses of small energy content relative to that of a sine wave of the same frequency and amplitude and subject to spurious pulses of similar nature, a relaxation device for generating a periodic output wave of approximately the same average frequency as said synchronizing signals, and means for substantially eliminating the effect of said spurious pulses and momentary interruptions of said periodic pulses comprising, means for deriving a periodic wave dependent in wave form upon the phase difference between said synchronizing signals and said output wave of said relaxation device, peak-rectifier means for developing from said derived wave a unidirectional control voltage dependent upon the amplitude of said derived wave on one side of its alternating current axis, means for utilizing said control wave to vary the instantaneous frequency of said relaxation device, thereby substantially to maintain the output of said device in phase with said synchronizing signals, and means for utilizing an output wave of said relaxation device to effect a scanning operation of said receiver.

9. In a television receiver, a circuit for supplying periodic synchronizing signals consisting of a series of periodic pulses of small energy content relative to that of a sine wave of the same frequency and amplitude and subject to spurious pulses of similar nature, a relaxation device for generating a periodic output wave of approximately the same average frequency as said synchronizing signals, and means for substantially eliminating the effect of said spurious pulses and momentary interruptions of said periodic pulses comprising, means for deriving a periodic wave dependent in wave form upon the phase difference between said synchronizing signals and said output wave of said relaxation device, means including a rectifier and circuit having a time constant which is long compared to the period of said synchronizing signals for developing from said derived wave a unidirectional control voltage, means for utilizing said control voltage to vary the instantaneous frequency of said relaxation device, thereby substantially to maintain the output of said device in phase with said synchroizing signals, and means for utilizing an output wave of said relaxation device to effect a scanning operation of said receiver.

10. In a television receiver, a circuit for supplying periodic synchronizing signals consisting of a series of periodic pulses of small energy content relative to that of a sine wave of the same frequency and amplitude and subject to spurious pulses of similar nature, a relaxation device for generating a periodic output wave of substantially the same average frequency as said synchronizing signals, and means for substantially eliminating the effect of said spurious pulses and momentary interruptions of said periodic pulses comprising, means for algebraically combining a periodic wave derived from said synchronizing signals and an output wave of said relaxation device to derive a periodic wave dependent in wave form upon the phase difference therebetween, rectifier means for developing from said last-mentioned derived wave a unidirectional control voltage, means for utilizing said control voltage to vary the instantaneous frequency of said relaxation device, thereby substantially to maintain said output of said device in phase with said synchronizing signals, and means for utilizing an output wave of said relaxation device to effect a scanning operation of said receiver.

11. In a television receiver, a circuit for supplying periodic synchronizing signals consisting of a series of periodic pulses of small energy content relative to that of a sine wave of the same frequency and amplitude and subject to spurious pulses of similar nature, a relaxation device for generating a periodic output wave of substantially the same average frequency as said synchronizing signals, and means for substantially eliminating the effect of said spurious pulses and momentary interruptions of said periodic pulses comprising, means for subtracting a periodic wave derived from said synchronizing signals and an output wave of said relaxation device to derive a periodic wave dependent in wave form upon the phase difference therebetween, rectifier means for developing from said last-mentioned derived wave a unidirectional control voltage, means for utilizing said control voltage to vary the instantaneous frequency of said relaxation device thereby substantially to maintain said output of said device in phase with said synchronizing signals, and means for utilizing an output wave of said relaxation device to effect a scanning operation of said receiver.

12. In a television receiver, a circuit for supplying periodic synchronizing signals consisting of a series of periodic pulses of small energy content relative to that of the sine wave of the same frequency and amplitude and subject to spurious pulses of similar nature and to momentary interruptions, a relaxation device proportioned to generate a periodic output wave of substantially saw-tooth wave form and of substantially the same average frequency as said synchronizing signals in the absence of a frequency-correcting control voltage applied thereto, and means for substantially eliminating the effect of said spurious pulses and momentary interruptions of said periodic pulses comprising, means for deriving a periodic saw-tooth wave from said synchronizing signals and combining it with the output wave of said relaxation device to derive a periodic pulse wave dependent in wave form on the difference therebetween, means for developing from said derived wave a unidirectional frequency-correcting control voltage, means for utilizing said control voltage to vary the instantaneous frequency of said relaxation device, thereby to maintain said output of said device in phase with said synchronizing signals, and means for utilizing an output wave of said relaxation device to effect a scanning operation of said receiver.

13. In a television receiver, a circuit for supplying periodic synchronizing signals consisting of a series of periodic pulses of small energy content relative to that of a sine wave of the same frequency and amplitude and subject to spurious pulses of similar nature and to momentary interruptions, a device proportioned to generate a periodic output wave of substantially the same average frequency as said synchronizing signal in the absence of a frequency-correcting control voltage applied thereto, and means for substantially eliminating the effect of said spurious pulses and momentary interruptions of said periodic pulses comprising, means for deriving a periodic wave dependent in wave form upon the phase difference between said synchronizing signals and said output wave of said device, means for developing from said derived wave a unidirectional frequency-correcting control voltage, means for utilizing said control voltage to vary the instantaneous frequency of said device, thereby substantially to maintain said output of said device in phase with said synchronizing signals, and means for utilizing an output wave of said device to effect a scanning operation of said receiver.

PIERRE MARIE GABRIEL TOULON.

CERTIFICATE OF CORRECTION.

Reissue No. 22,055. March 24, 1942.

PIERRE MARIE GABRIEL TOULON.

It is hereby certified that error appears in the printed specification of the above numbered patent requiring correction as follows: Page 2, second column, line 19, before "its" strike out "in"; page 3, second column, line 61, and page 4, first column, lines 10, 35 and 59, and second column, lines 10, 36 and 61, claims 5 to 11 inclusive, after "nature" and before the comma insert --and to momentary interruptions--; page 3, second column, lines 61 and 62, and page 4, first column, lines 11 and 36, and lines 59 and 60, and second column, lines 10 and 11, lines 36 and 37, and lines 61 and 62, claims 5 to 11 inclusive, for "for generating" read --proportioned to generate--; page 3, second column, line 62-63, and page 4, first column, lines 12-13, 37 and 60-61, and second column, line 11-12, claims 5 to 9 inclusive; for "approximately" read --substantially--; page 3, second column, line 64, and page 4, first column, lines 14, 38 and 62, and second column, lines 13, 39 and 64, claims 5 to 11 inclusive, after "signals" and before the comma insert --in the absence of a frequency-correcting control voltage applied thereto--; page 3, second column, line 70, claim 5, strike out "rectifier"; same page and column, line 72, and page 4, first column, lines 22, 46 and 70, and second column, lines 23, 48 and 73, claims 5 to 11 inclusive, after "unidirectional" insert --frequency-correcting--; page 4, first column, lines 21 and 45, and second column, line 47, claims 6, 7 and 10, respectively, strike out "rectifier"; and that the said Letters Patent should be read with this correction therein that the same may conform to the record of the case in the Patent Office.

Signed and sealed this 14th day of July, A. D. 1942.

Henry Van Arsdale,
Acting Commissioner of Patents.

(Seal)